US009961043B2

(12) United States Patent
Gopalarathnam et al.

(10) Patent No.: US 9,961,043 B2
(45) Date of Patent: May 1, 2018

(54) AUTOMATIC DISCOVERY AND CONFIGURATION OF STACK PORTS

(71) Applicant: DELL PRODUCTS L.P., Round Rock, TX (US)

(72) Inventors: Sudharsan Dhamal Gopalarathnam, Tamilnadu (IN); Shankar Narayanan Raghavendran, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 363 days.

(21) Appl. No.: 14/627,661

(22) Filed: Feb. 20, 2015

(65) Prior Publication Data
US 2016/0246618 A1    Aug. 25, 2016

(51) Int. Cl.
*H04L 29/12* (2006.01)
*H04L 29/08* (2006.01)
*G06F 9/44* (2018.01)

(52) U.S. Cl.
CPC .......... *H04L 61/1511* (2013.01); *H04L 67/34* (2013.01); *G06F 9/4401* (2013.01); *H04L 61/2015* (2013.01)

(58) Field of Classification Search
CPC .............. H04L 41/0806; H04L 41/082; H04L 41/0813; H04L 41/12
USPC ........................................................ 713/100
See application file for complete search history.

(56) References Cited

U.S. PATENT DOCUMENTS

| 8,046,450 B1* | 10/2011 | Schloss ............... H04L 41/0809 709/220 |
| 8,934,378 B1* | 1/2015 | Novick ................... H04L 45/04 370/255 |
| 9,197,696 B1* | 11/2015 | Jakatdar .................. H04L 67/06 |
| 9,282,058 B2* | 3/2016 | Lin ....................... H04L 49/351 |
| 9,419,842 B1* | 8/2016 | Galliher, III ............ H04L 29/06 |
| 2003/0198231 A1* | 10/2003 | Kalkunte ............. H04L 12/5601 370/395.31 |
| 2004/0098458 A1* | 5/2004 | Husain ................ H04L 41/0803 709/204 |
| 2008/0239970 A1* | 10/2008 | Lu ..................... H04L 12/40182 370/245 |
| 2010/0182933 A1* | 7/2010 | Hu ........................ H04L 41/082 370/254 |
| 2010/0257283 A1* | 10/2010 | Agarwal ................. H04L 63/08 709/250 |
| 2010/0272010 A1* | 10/2010 | Hicks, III ........... H04L 12/2838 370/328 |
| 2010/0284414 A1* | 11/2010 | Agarwal ............... H04L 49/351 370/401 |
| 2011/0007670 A1* | 1/2011 | Yan ........................ H04L 12/42 370/255 |
| 2011/0023111 A1* | 1/2011 | Gunadisastra .......... G06F 21/34 726/16 |
| 2012/0159235 A1* | 6/2012 | Suganthi ............. G06F 11/2028 714/4.11 |
| 2012/0314581 A1* | 12/2012 | Rajamanickam ... H04L 41/0826 370/238 |

(Continued)

*Primary Examiner* — Thomas Lee
*Assistant Examiner* — Santosh R Poudel
(74) *Attorney, Agent, or Firm* — Haynes and Boone, LLP

(57) ABSTRACT

A method of forming a stack is presented. According to some embodiments, a stack can be formed by determining stack ports in a group of units and converting the stack ports. In some embodiments, the stack ports can be converted to stacking mode.

17 Claims, 4 Drawing Sheets

(56) References Cited

U.S. PATENT DOCUMENTS

| | | | | |
|---|---|---|---|---|
| 2013/0141747 A1* | 6/2013 | Oba | G06F 3/1292 | 358/1.14 |
| 2013/0201867 A1* | 8/2013 | Johnston | H04L 43/0811 | 370/254 |
| 2014/0185461 A1* | 7/2014 | Gautreau | H04L 45/245 | 370/244 |
| 2014/0204953 A1* | 7/2014 | Tsubota | H04L 49/65 | 370/401 |
| 2014/0254432 A1* | 9/2014 | Jagannathan | H04L 41/0806 | 370/255 |
| 2015/0117263 A1* | 4/2015 | Agarwal | H04L 49/65 | 370/255 |
| 2015/0124655 A1* | 5/2015 | Saxena | H04L 41/0803 | 370/256 |
| 2015/0222592 A1* | 8/2015 | Andrews | H04L 61/2015 | 709/221 |
| 2015/0288567 A1* | 10/2015 | Lin | H04L 41/0856 | 370/254 |
| 2015/0295755 A1* | 10/2015 | Zhou | H04L 12/12 | 370/254 |
| 2015/0341253 A1* | 11/2015 | Scheurich | H04L 41/0893 | 370/422 |
| 2016/0006607 A1* | 1/2016 | Wang | H04L 41/0809 | 709/222 |
| 2016/0124477 A1* | 5/2016 | Guy | H04L 12/40045 | 713/300 |
| 2016/0127260 A1* | 5/2016 | Gordon | H04L 47/783 | 709/226 |
| 2016/0204959 A1* | 7/2016 | Liang | H04L 12/6418 | 370/395.53 |

* cited by examiner

AUTOMATIC DISCOVERY AND CONFIGURATION OF STACK PORTS

BACKGROUND

Technical Field

Embodiments of the present invention are related to discovery and configuration of stack ports in stacked devices.

Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Therefore, there is a need to develop a better system for handling the identification and configuring of the stack ports in stacked devices.

SUMMARY

In accordance with aspects of the present invention, a method of forming a stack, includes exchanging configured hostnames through all frontend ports; detecting stack ports in the group of units; and initiating a stacking algorithm in the group of units to form a stack from the group of units. In some embodiments, the detected stack ports can be converted to stacking mode.

These and other embodiments are further discussed below with respect to the following figures.

DETAILED DESCRIPTION

Figure 1A:
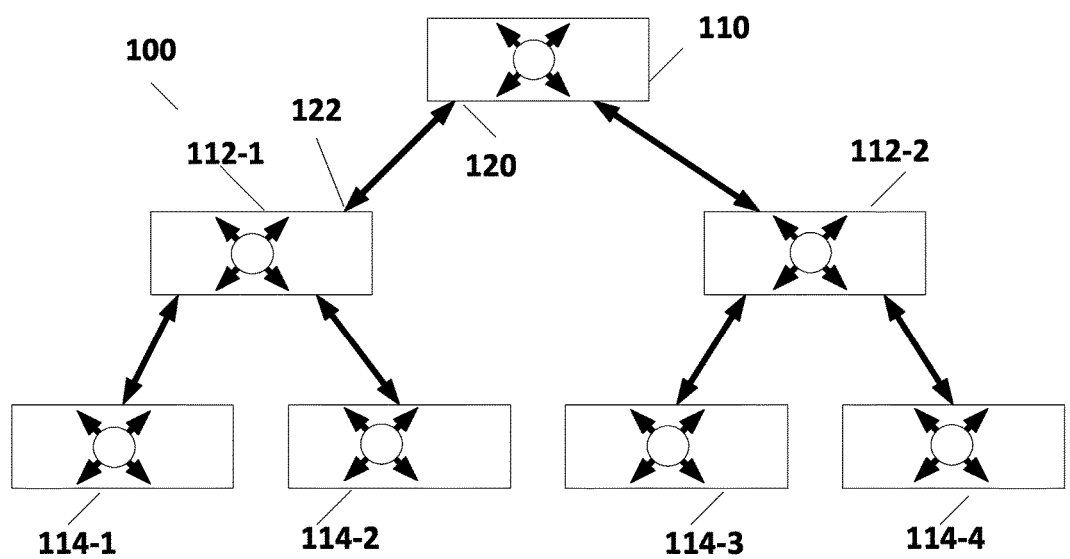
FIGS. 1A and 1B illustrates stacking of devices.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various mechanical, compositional, structural, and operational changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements.

The singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1A illustrates an example of a stacked device 100 that can operate according to some embodiments of the present invention. Stacked device 100 as illustrated in FIG. 1A includes any number of coupled devices 110 in a tree configuration. In the particular example illustrated in FIG. 1A, a master device 110 is coupled to slave devices 112-1 and 112-2. Slave device 112-1, in turn, is coupled to slave devices 114-1 and 114-2. Slave device 112-2 is coupled to slave devices 114-3 and 114-4. Any number of devices 110, 112 (112-1 and 112-2), and 114 (114-1 through 114-4) can be coupled. Devices are coupled to one another in the stack through stack ports. As shown in FIG. 1A, for example, device 110 is coupled to device 112-1 through stack port 120 of device 110 and stack port 122 on device 112-1. Each of the ports of devices 110, 112, and 114 that are used to couple devices within stack 100 are referred to as "stack ports."

Figure 1B:
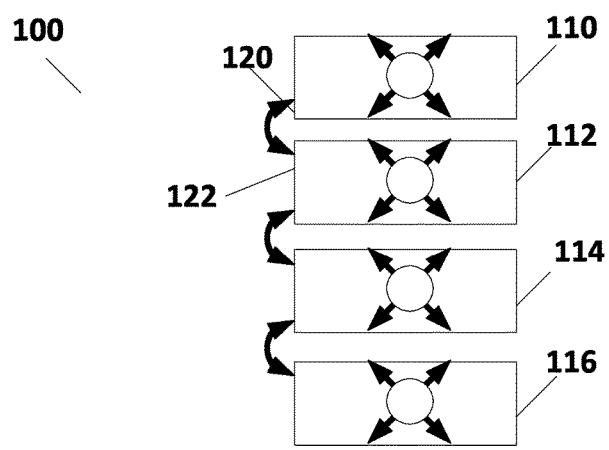

Any number of stacking arrangements can be made to form stack device 100. FIG. 1B illustrates another arrangement of devices 110, 112, 114 and 116 to form stack device 100. FIG. 1B illustrates an arrangement where devices 110, 112, 114, and 116 in a linear fashion. As shown in FIG. 1B, device 110 is coupled to device 112 through stack port 120 on device 110 and stack port 122 on device 112. Other stacking arrangements, for example a ring arrangement, can also be arranged.

Figure 1C:
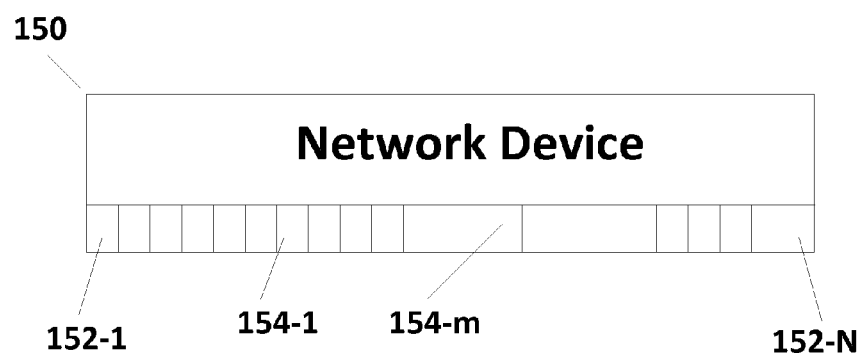
FIG. 1C illustrates a device that can be included in the stack of devices illustrated in FIG. 1A.

FIG. 1C illustrates a network device 150, which can be any of devices 110, 112, 114 and 116. As shown in FIG. 1C, network device 150 is an information handling system that includes N ports, ports 152-1 through 152-N. When device 150 is included in a stack arrangement as is illustrated in FIGS. 1A and 1B, certain of ports 152-1 through 152-N are designated as stack ports. As illustrated in FIG. 1C, stack ports 154-1 through 154-*m* of ports 152-1 through 152-N are used to couple device 150 with other devices in stack 100 and therefore are designated as stack ports.

Figure 2:
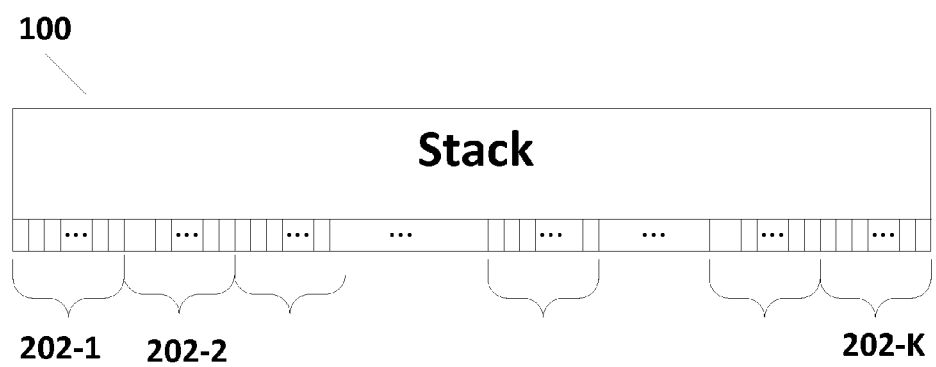
FIG. 2 illustrates the single device equivalent of the stacked devices illustrated in FIGS. 1A and 1B.

FIG. 2 illustrates a conceptual diagram of stack 100. As shown in FIGS. 1A and 1B, stack 100 is formed by connecting a number of network devices, such as device 150 shown in FIG. 1C, to operate as a single device, stack 100. Consequently, stack 100 offers various advantages in the networking environment. For example, the stack has a single IP address, which reduces the total number of IP addresses in the network. Any configuration changes to stack 100 can be applied to all of the devices 150 that are included in stack 100, usually through a master device as illustrated in FIG. 1A. Usually, master device 110 controls all of stack 100. Master device 110 may be selected automatically by stack 100 during configuration. As such, as shown in FIG. 2, stack 100 operates the network as a single device with the resources of all of the devices 150 included in stack 100. For example, as shown in FIG. 2, stack 100 includes ports 202 where ports 202-1 are from a first network device and ports 202-K are from a Kth network device.

Currently in front end port or user port stacking, the stack ports are configured using a command-line-interface (CLI) configuration. Usually this is done per port or for a group of ports called stack group using special configuration commands. This can be a difficult and lengthy process, requiring lots of configuration instructions for stacks with large numbers of network devices or a large number of stack ports in use. The port numbering and mapping to the stack group varies among different platforms and thus configuring stack ports can be difficult. Some embodiments of the present invention can solve these issues by automatically detecting the stack ports and configuring them appropriately while using a minimum number of CLI messages.

Figure 3:
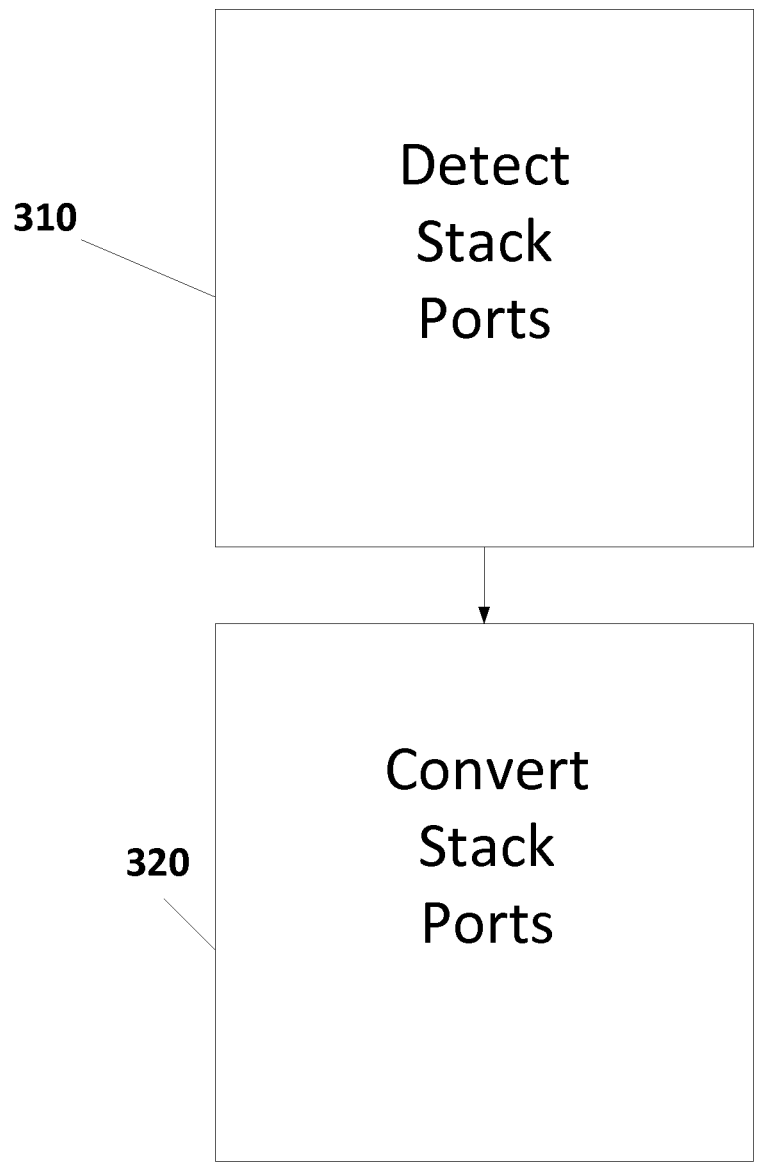
FIG. 3 illustrates the process for detecting the stack ports and configuring the stack ports according to the present invention.

As shown in FIG. 3, some embodiments of the current invention operate in two parts: detecting stack ports in step 310 and converting the stack ports to an available stacking mode, for example HiGig mode, in step 320. HiGig mode is a protocol used, for example, in Broadcom chipsets. Currently, the stacking algorithm technique in Broadcom chips operates entirely in higig mode.

Figure 4:
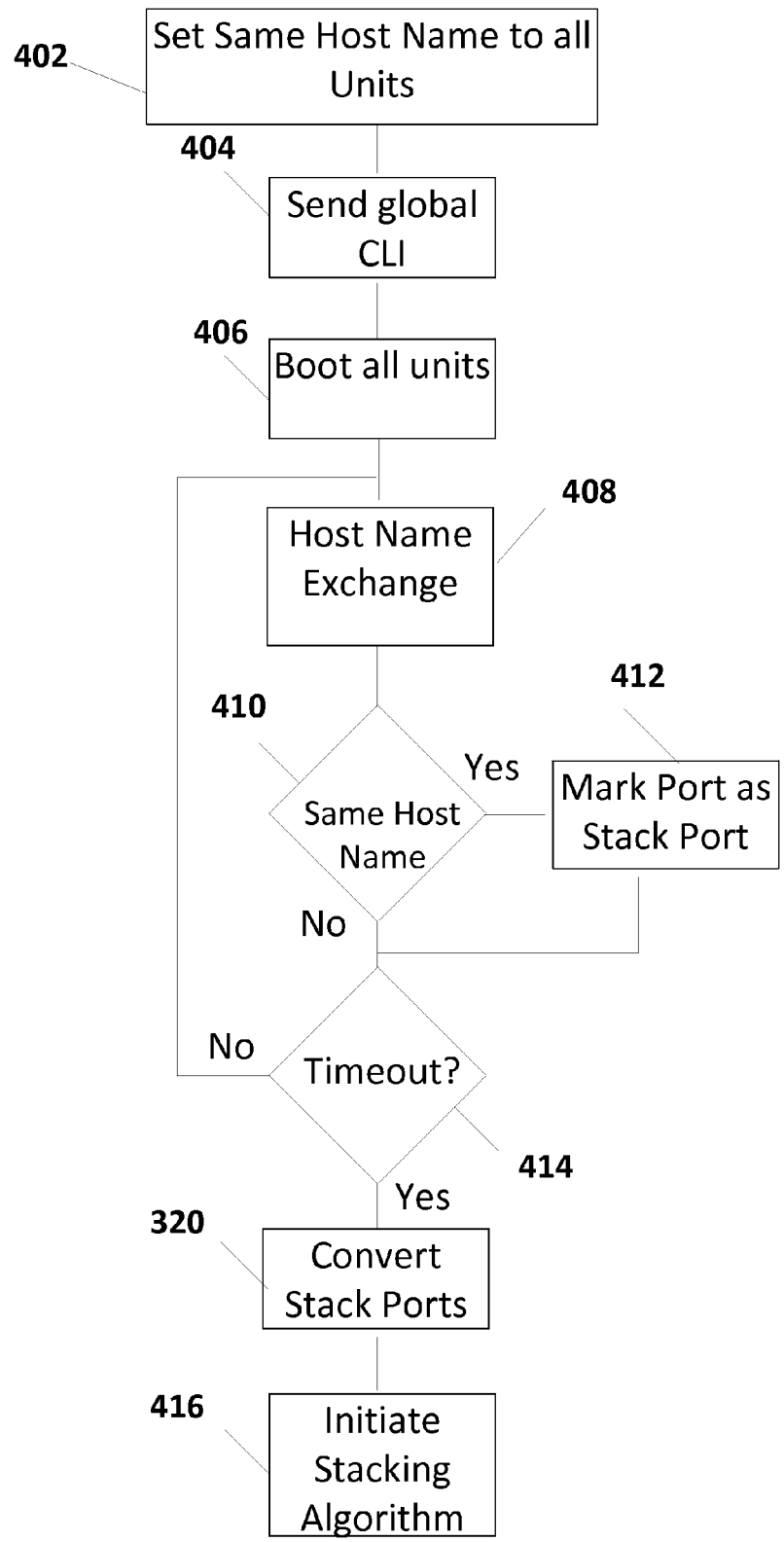
FIG. 4 illustrates the process for detecting the stack ports in more detail.

FIG. 4 illustrates in more detail an example of the procedure shown in FIG. 3. In embodiments of the current invention, peer discovery happens in front end mode and topology formation happens in higig mode where ports are converted to stacking mode once discovered and identified as stacking ports.

As shown in FIG. 4, in step 402 a particular hostname is configured on all units that are to be stacked. As an example, the hostname for all units in the stack, designated as Dom1 in this example, is set to be the same. The hostname is the name that identifies the device on the network and is easier to remember than an IP address. The hostname should be unique within the network infrastructure, but there is no need for the local hostname to be globally unique.

A device's hostname usually has a corresponding entry in the domain name system (DNS) so that administrators can connect to the device using the hostname. The fully qualified domain name, which is used in DNS, includes the hostname and the domain name.

The hostname can be configured via a CLI or can be present in a configuration file sent via DHCP.
hostname Dom1.
Therefore, in step 404 each of the units in the stack is configured with hostname DOM1. In step 406, all units are booted together. When units boot up in step 406, all ports are initialized as front end ports and enabled.

In step 408, hostnames are exchanged between units. Typically, the hostname exchange can be undertaken under a Link-Layer Discovery Protocol (LLDP) such as that described in the standards IEEE 802.1AB-2005 and ANSI/TIA-1057. With LLDP, units are initiated and hostnames are exchanged using the host Type-Length-Values (TLVs) that currently exists namely a management-tlv 'system-name.' The LLDP TLV can be sent through the all the ports during initial discovery in step 408. In step 410, each unit determines whether it receives on a port a hostname that is the same as that assigned to the unit. If the hostname received in a port is the same as the unit, then the port is marked as a stack port and a peer MAC address is identified in step 412. This discovery happens till a particular configured timeout.

Once the peer discovery happens, the stack ports are converted to stacking mode in step 320, for example using a flex port configuration available in Broadcom chipsets, and a stacking algorithm is started in step 416. Since peer information is already identified, the stacking algorithm initiated in step 416 can skip identification of peer information and data can be populated from LLDP information. The stacking algorithm initiated in step 416, then, can proceed to overall topology identification and master election phases of the initialization.

The stack ports identified are either inserted into configuration or can be stored in a nonvolatile memory. Conventionally, peer unit discovery happens in a stacking algorithm when stack ports are in a converted, for example stacking, mode, therefore initiation of stack algorithm in step 416 doesn't take any additional time. In accordance with some embodiments of the present invention, peer discovery is accomplished in front-end port mode and peer discovery data is used in next stage of stacking algorithm initiation after the stack ports are converted, for example to higig mode.

The default state of the port which are not converted or externally configured otherwise is set to enable (no shutdown) and LLDP is enabled. Consequently, any unit not included in the initial setup of the stack can join late by communicating LLDP information without user intervention.

Additionally if hostname is changed, the TLV can be exchanged through default config ports. This would help in stack merge cases. An alternative approach would be to send LLDP TLV at regular intervals on default configuration ports to perform discovery of the resulting stack.

When a stack link state changes the port mode of the associated stack port can be dynamically modified to front end mode. The port can again be converted to a stack port and connected to the stack when discovery occurs via LLDP TLV mechanisms as specified above. If the port is planned to be used for some other purpose by connecting it to a different setup or device then it would not be converted back to a stack port since the same hostname will not be received on the port. Thus the user can also dynamically toggle between the modes without need for configuration changes.

The basic assumption is that no loop back connections exist between members of a stack unit apart from the stack ports. If two units that are intended to be part of a stack are connected, then the ports connecting them are defined to be stack ports. Some embodiments of the present invention ease the configuration of stack ports and also avoids additional per port configuration costs that currently exists. Moreover in solutions which have hardcoded stack-ports, where stack ports are fixed in stacking mode, this solution can be used for flexibility to allow an interconnected port to be used as a stack port.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of forming a stack from a group of units, comprising:
    exchanging a plurality of configured hostnames through a corresponding plurality of frontend ports associated with the group of units;
    automatically detecting a plurality of stack ports among the plurality of frontend ports based on the plurality of exchanged configured hostnames, wherein automatically detecting the plurality of stack ports includes, at each unit, if a first hostname received at a port of the unit matches a second hostname of the unit, setting the port as a stack port;
    initiating a stacking algorithm in the group of units to form the stack from the group of units; and
    operating the stack as a single network unit.

2. The method of claim 1, further including sending a hostname to the group of units by:
    determining a hostname for the group of units; and
    setting the hostname in each of the group of units.

3. The method of claim 1, further including converting the plurality of stack ports.

4. The method of claim 3, wherein converting the plurality of stack ports includes converting the plurality of stack ports to a specific stacking mode.

5. The method of claim 4, wherein the specific stacking mode is a higig mode.

6. The method of claim 1, wherein initiating a stacking algorithm includes choosing a master from amongst the group of units.

7. The method of claim 1, wherein a separate unit can join the stack at a later time.

8. A stack comprising a group of units linked through stack ports and operating as a single unit, wherein the stack is formed by:
    setting a shared hostname for the group of units;
    automatically detecting stack ports in the group of units based on the shared hostname, wherein automatically detecting the stack ports in the group of units includes exchanging hostnames amongst the group of units, and at each unit, if a hostname received at a port of the unit matches the shared hostname, setting the port as a stack port;
    converting the stack ports; and
    initiating a stacking algorithm in the group of units to form the stack from the group of units.

9. The stack of claim 8, wherein converting the stack ports includes converting the stack ports to a stacking mode.

10. The stack of claim 9, wherein the stacking mode is a higig mode.

11. The stack of claim 8, wherein initiating the stacking algorithm includes choosing a master from amongst the group of units.

12. The stack of claim 8, wherein a separate unit can join the stack at a later time.

13. A method of forming a stack from a group of units, comprising:
    automatically detecting stack ports based on a shared hostname by providing the shared hostname to the group of units, rebooting the group of units, exchanging hostnames between the group of units, and assigning ports that receive a hostname identical to the shared hostname as stack ports;
    forming a stack from the group of units by converting the stack ports; and
    operating the stack as a single unit.

14. The method of claim 13, further including initiating a stacking algorithm.

15. The method of claim 13, wherein converting the stack ports includes converting the stack ports to a stacking mode.

16. The method of claim 15 wherein the stacking mode is a higig mode.

17. The method of claim 13, wherein the shared hostname is provided to the group of units in a configuration file sent via DHCP.

* * * * *